United States Patent [19]

Arai

[11] Patent Number: 5,059,320

[45] Date of Patent: * Oct. 22, 1991

[54] LOCKING STRUCTURE OF WIRE ROD FOR FILTER ELEMENT

[75] Inventor: Koichi Arai, Kanagawa, Japan

[73] Assignee: Arai Corporation, Japan

[*] Notice: The portion of the term of this patent subsequent to Jul. 4, 2006 has been disclaimed.

[21] Appl. No.: 446,082

[22] Filed: Dec. 5, 1989

[30] Foreign Application Priority Data

Dec. 7, 1988 [JP] Japan .................................. 63-15829

[51] Int. Cl.⁵ ...................... B01D 27/06; B01D 29/05
[52] U.S. Cl. .................................. 210/232; 210/497.1;
210/497.3; 55/400; 29/163.7; 29/163.8
[58] Field of Search ...................... 210/474, 488, 494.2,
210/497.01, 497.1, 497.3, 232; 29/163.7, 163.8;
55/400

[56] References Cited

U.S. PATENT DOCUMENTS

| 4,115,278 | 9/1978 | Fritsch | 210/497.3 |
| 4,843,700 | 7/1989 | Arai | 29/163.7 |
| 4,846,971 | 7/1989 | Lamont | 29/163.8 |

Primary Examiner—Robert A. Dawson
Assistant Examiner—Wanda L. Millard
Attorney, Agent, or Firm—Dykema Gossett

[57] ABSTRACT

A locking structure of a wire rod for a filter element which comprises a support member of either a cylindrical, flat plate or inverted conical shape, a threaded groove helically formed on an outer or inner peripheral surface of the support member, along which groove a wire rod of a desired sectional form is wound, leaving a spiral continuous slit between windings, allowing flow of a fluid to be filtered or separated. Each end portion of the wire rod is bent so as to be merely pushed and firmly secured in a locking hole formed on the support member, without using a locking member such as an insert member or wedge.

21 Claims, 2 Drawing Sheets

A : Support member
A₁ : Cylindrical form
B : Passage
F : Filter element
1 : Wire rod for element
2 : Threaded groove
3 : Slit
4 : Bent end portion

- A : Support member
- A₁ : Cylindrical form
- B : Passage
- F : Filter element
- 1 : Wire rod for element
- 2 : Threaded groove
- 3 : Slit
- 4 : Bent end portion A₂ : Inverted conical form $A_3$ : Flat plate 4 : End portion
5 : Locking hole

LOCKING STRUCTURE OF WIRE ROD FOR FILTER ELEMENT

BACKGROUND OF THE INVENTION

1. Field of the Invention

The present invention relates to a simplified locking structure of a wire rod for a filter element.

2. Description of the Prior Art

One of the locking structures of this kind is disclosed by the applicant in Japanese Patent Publication No. 16164/1988, and another in Japanese Patent Laid-open Application No. 9204/1988.

In the case of the former locking structure, one end portion of the wire rod, bent and wrapped around an insert member, is inserted in a recess formed on the circumferential surface of a cylindrical body, and securely locked by means of a locking bolt, which is inserted through a hole formed on the opposed walls of the insert member and the recess, and is engaged in a threaded portion formed in the bottom of the hole.

The above-described prior art structures are advantageous for filter elements of high precision filtering material made through precision finishing method.

In the latter locking structure, the locking structure is largely simplified by utilizing a wedge instead of the insert member and also the locking bolt of the former case, and thereby the end portion of the wire rod being pushed by the wedge and secured within a locking hole.

The aforementioned prior art patents, which were disclosed by the same applicant of the present invention, are provided with certain advantages and effects according to the improved locking structure, accuracy or dimension of the filter element.

There are still some problems that an insert member or a wedge is necessary as a locking member. In particular, in the case when an inexpensive filter element can be provided by using cheaper materials such as plastics, the locking structure should be further simplified to expedite mass production.

SUMMARY OF THE INVENTION

An object of the present invention is to provide a locking structure of a wire rod for a filter element, whereby an improved locking structure is enabled by an utmost simplest arrangement.

The invention is concerned with a locking structure of a wire rod for a filter element, which comprises a support member of a desired form with a desired passage therein for fluid, a wire rod having a desired section wound along a threaded groove formed on an outer or inner peripheral surface of the support member for maintaining a continuous slit between each of the adjacent windings of the wire rod, whereby an end portion of the wire is bent and forcibly pushed in a locking hole formed on the support member to be securely locked to the support member. More specifically, the wire rod may be formed to be triangular in cross section, and retained on the peripheral surface of the support member such that the apex of the triangular section can be fitted to the threaded groove having a corresponding angle formed on the peripheral surface.

The end portion of the wire rod is simply locked by pushing it into the locking hole, thereby fixing the end portion extremely rapidly and efficiently. In addition, the support member having a passage can be provided with a threaded groove having a desired form, along which a wire rod having a corresponding section can be fitted to form a continuous slit between windings, thereby filtration or separation of solid and liquid being capable according to the dimension or length of the slit.

DETAILED DESCRIPTION OF PREFERRED EMBODIMENTS

The preferred embodiments of the invention will now be described with reference to the accompanying drawings.

Figure 2:
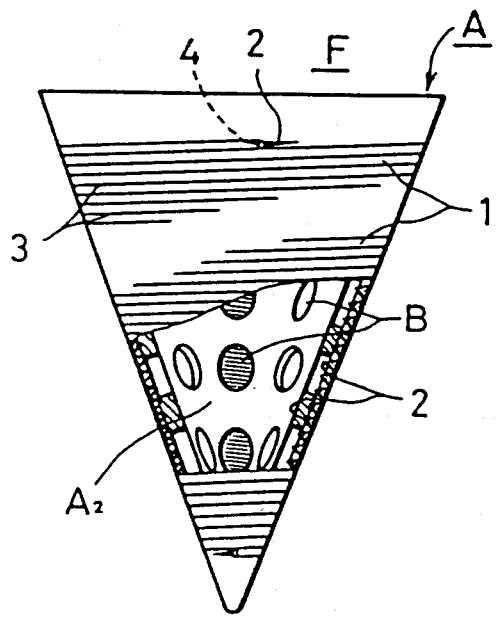
FIG. 2 is a partially cutaway front view of a filter element according to another embodiment, in which a support member is formed as an inverted cone.
Figure 3:
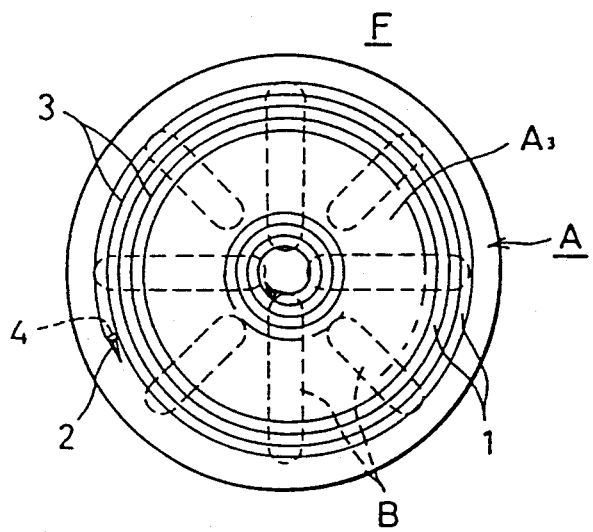
FIG. 3 is a plan view of a support member formed as a flat plate.
Figure 4:
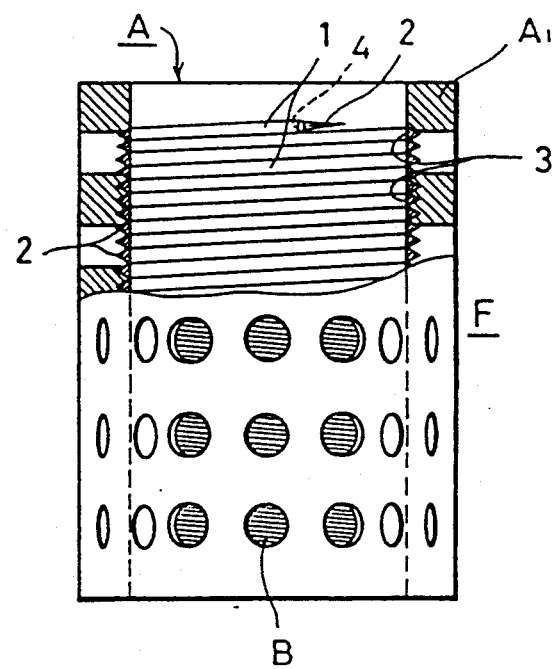
FIG. 4 is a partially cutaway front view of a filter element, in which a support member is formed as another structure of a cylinder.
Figure 5:
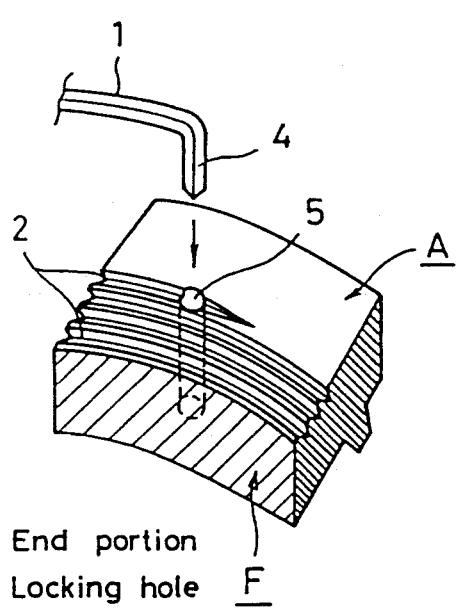
FIG. 5 is an enlarged perspective view of the wire locking structure, illustrating an end portion of a wire rod and a locking hole.

In FIG. 1 to 4, four types of filter elements are represented. These are different in the form of the support member A. FIG. 4 shows an embodiment, in which a wire rod is wound on the inner surface of the support member. The reference letter A denotes a support member commonly in each of FIGS. 1 to 5. The locking structure of the wire rod is the same in all embodiments.

Figure 1:
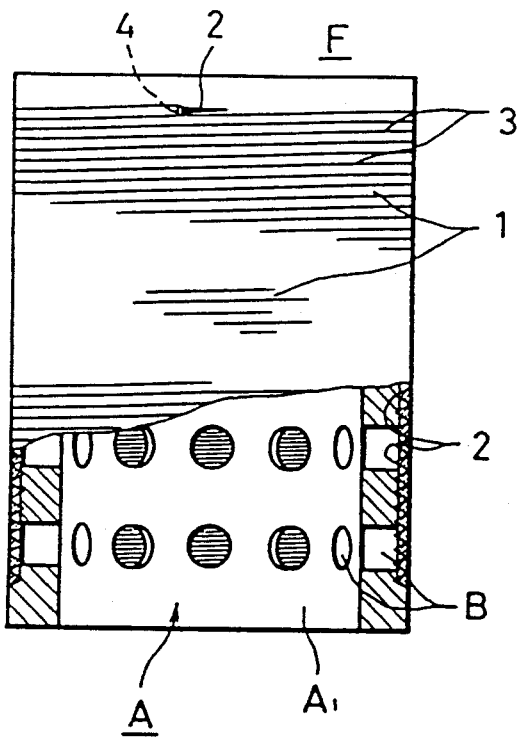
FIG. 1 is a partially cutaway front view of a filter element, in which a wire locking structure according to the present invention is disposed.

Referring now to FIG. 1, an embodiment comprising a cylinder A1 as support member is illustrated. Similarly, FIGS. 2 and 3 represent each embodiment comprising a support member of an inverted conical form A2, and of a flat plate A3. FIG. 4 represents another embodiment including a cylinder A1 as shown in FIG. 1, but the arrangement of a plurality of passage B provided in support member A is different from each other.

Support member A is provided with a coil-shaped, spiral or helical groove 2 having an accurate pitch size on the outer (FIGS. 1, 2 and 3) or inner (FIG. 4) peripheral surface thereof. A wire rod 1 is wound along the groove 2 so as to be maintained in a coiled form. A reference numeral 3 denotes a continuous slit formed between the adjacent windings of the wire 1, which slit forms a passage for the fluid, which is subject to filtration or separation of solid and liquid.

A bent portion is formed at each end of wire rod 1. A reference numeral 5 denotes a locking hole formed at a terminus 4a of the threaded groove 2 in the end area of support member A. The bent portion 4 can be pushed into the locking hole 5 and secured therein. The hole 5 is preferably formed at a right angle or less with respect to the winding direction of wire rod 1 and is formed slightly smaller in diameter than wire rod 1, and larger in depth than the length of bent portion 4. Further, the locking hole 5 may be formed slightly larger in diameter at open end portion 5a than the remaining portion to ease the initial engagement of bent portion 4 with the locking hole 5.

Accordingly, at each of the start and terminus of winding of the wire rod 1 on support member A, the bent portion 4 can be pushed into the locking hole 5, and thus be firmly locked.

In the aforementioned embodiment, a metal wire having a triangular section is shown as wire rod 1 for the filter element. Another form of a section, such as round, rectangular, or trapezoidal, can be selected for wire rod 1. Further, any material, such as ceramic, carbon fiber or plastic instead of metal, can be preferably used. In addition, if necessary, a suitable adhesive can be also utilized for increasing adhesion between the locking hole 5 and bent portion 4.

According to the invention, an end portion of the wire rod can be securely and simply locked by being bent and merely pushed in the locking hole formed on the support member, which can be of a preferable configuration, thereby effecting high working facility and a reduction of production cost. Further, a stable locking of the wire rod is assured without causing looseness.

What is claimed is:

1. A locking structure of a wire rod for a filter element including:
   a) a support member formed in the shape of a hollow cylinder and having passages into and out of said support member, said support member further including:
      i) an inner and an outer peripheral surface, and
      ii) a threaded grove formed on said inner or outer peripheral surface,
   b) a wire rod having at least one bent end portion and a desired cross-section wound around said support member to form a continuous spiral groove between each winding of said wire rod; and
   c) at least one locking hole formed on said support member to receive said bent portion of said wire rod, said locking hole being of a slightly smaller diameter than the diameter of said wire rod.

2. The device defined in claim 1, wherein said wire rod is triangular in cross-section and is retained on said peripheral surface of said support member by the apex of said triangular cross-section being fitted into said threaded groove.

3. The device defined in claim 2, wherein said threaded groove has a shape complimentary to said apex of said wire rod.

4. The device defined in claim 1, wherein said locking hole is a at right angle to said peripheral surface.

5. The device defined in claim 4, wherein said locking hole is tapered.

6. The device defined in claim 1, wherein said wire rod is of circular cross-section.

7. The device defined in claim 1, wherein said locking hole is formed at less than a right angle with said peripheral surface with respect to the winding direction of said wire rod.

8. A locking structure of a wire rod for a filter element including:
   a) a support member formed in the shape of a flat plate, and having passages into and out of said support member, said support member further including,
      i) an inner and an outer peripheral surface,
      ii) a threaded groove formed on said inner or outer peripheral surface; and
   b) a wire rod having at least one bent end portion and a desired cross-section wound around said support member to form a continuous spiral groove between each winding of said wire rods; and
   c) at least one locking hole formed on said support member to receive said bent portion of said wire rod, said locking hole being of a slightly smaller diameter than the diameter of said wire rod.

9. The device defined in claim 8, wherein said wire rod is triangular in cross-section and is retained on said peripheral surface of said support member by the apex of said triangular cross-section being fitted into said threaded groove.

10. The device defined in claim 9, wherein said threaded groove has a shape complimentary in shape to said apex of said wire rod.

11. The device defined in claim 8, wherein said locking hole is at a right angle to said peripheral surface.

12. The device defined in claim 11, wherein said locking hole is tapered.

13. The device defined in claim 8, wherein said wire rod is of circular cross-section.

14. The device defined in claim 8, wherein said locking hole is formed at less than a right angle with said peripheral surface with respect to the winding direction of said wire rod.

15. A locking structure of a wire rod for a filter element including, in combination:
   a) a support member formed in the shape of an inverted cone and having passages into and out of said support member, said support member further including,
      i) an inner and outer peripheral surface,
      ii) a threaded groove formed on said inner or outer peripheral surface,
   b) a wire rod having at least one bent end portion and being of a desired cross-section wound around said support member to form a continuous spiral groove between each winding of said wire rod; and
   c) at least one locking hole formed on said support member to receive said bent portion of said wire rod, said hole being of a smaller diameter than said wire rod, said bent portion of said wire rod being forced into said hole.

16. The device defined in claim 15, wherein said wire rod is triangular in cross-section, and is retained on said peripheral surface of said support member by the apex of said triangular cross-section being fitted into said threaded groove.

17. The device defined in claim 16, wherein said threaded groove has a shape complimentary to said apex of said wire rod.

18. The device defined in claim 15, wherein said locking hole is at a right angle to said peripheral surface with respect to the winding direction of said wire rod.

19. The device defined in claim 18, wherein said locking hole is tapered.

20. The device defined in claim 15, wherein said wire rod is of a circular cross-section.

21. The device defined in claim 15, wherein said locking hole is formed at an angle less than a right angle with said peripheral surface.

* * * * *

UNITED STATES PATENT AND TRADEMARK OFFICE
CERTIFICATE OF CORRECTION

PATENT NO. : 5,059,320
DATED : October 22, 1991
INVENTOR(S) : Koichi Arai

It is certified that error appears in the above-identified patent and that said Letters Patent is hereby corrected as shown below:

Title page, item (30):

In the Foreign Application Priority Data, please delete "63-15829", and insert -- 63-158529 --.

Signed and Sealed this

Second Day of March, 1993

Attest:

STEPHEN G. KUNIN

Attesting Officer

Acting Commissioner of Patents and Trademarks